(12) United States Patent
Mullen

(10) Patent No.: US 7,266,193 B2
(45) Date of Patent: Sep. 4, 2007

(54) ADAPTIVE FEEDBACK ARRANGEMENT FOR CONTROLLING AGENT AVAILABILITY SERVICE LEVEL IN A PREDICTIVE DIALER

(75) Inventor: David C. Mullen, Newcastle, WA (US)

(73) Assignee: Avaya Technology Corp., Basking Ridge, NJ (US)

( * ) Notice: Subject to any disclaimer, the term of this patent is extended or adjusted under 35 U.S.C. 154(b) by 679 days.

(21) Appl. No.: 10/740,988

(22) Filed: Dec. 18, 2003

(65) Prior Publication Data

US 2005/0135599 A1    Jun. 23, 2005

(51) Int. Cl.
*H04M 3/00* (2006.01)
*H04M 5/00* (2006.01)

(52) U.S. Cl. .............................. 379/266.08; 379/266.07

(58) Field of Classification Search ................................ 379/265.02–266.1, 309
See application file for complete search history.

(56) References Cited

U.S. PATENT DOCUMENTS

| | | |
|---|---|---|
| 5,327,490 A | 7/1994 | Cave |
| 5,467,391 A | 11/1995 | Donaghue, Jr. et al. |
| 5,815,566 A | 9/1998 | Ramot et al. |
| 5,889,799 A * | 3/1999 | Grossman et al. ..... 379/266.08 |

OTHER PUBLICATIONS

"Achieving Compliance for Nuisance Calling," Avaya White Paper, Oct. 2003, 10 pp.
"Predictive Dialers," CMP Media, Comm Web, Oct. 3, 2000, 4 pp. (http://www.commweb.com/shared/article/showArticle.jhtml?articleID8703742).

* cited by examiner

*Primary Examiner*—Benny Q Tieu
(74) *Attorney, Agent, or Firm*—David Volejnicek

(57) ABSTRACT

A feedback control for a predictive dialer employs three feedback loops. A first feedback loop adjusts the dialer's call initiations to compensate for error between the desired, reference, service level and a service level realized by calls that were initiated by the predictive dialer to steer the realized service level to the reference service level. A second loop adjusts the predictive dialer's call initiations for margin between the number of non-nuisance calls (successes) initiated by the predictive dialer over a time and the number of successes that would have been sufficient to produce the reference service level to force the realized service level to converge to the reference service error while ensuring that the oscillations of the realized service level stay above the reference service level. A third loop controls the aggressiveness with which the predictive dialer initiates calls, with a calibration factor that compensates for systematic error in the aggressiveness and possibly attenuates oscillations in the realized service level.

45 Claims, 2 Drawing Sheets

200

ADAPTIVE FEEDBACK ARRANGEMENT FOR CONTROLLING AGENT AVAILABILITY SERVICE LEVEL IN A PREDICTIVE DIALER

TECHNICAL FIELD

This invention relates to predictive dialers.

BACKGROUND OF THE INVENTION

A predictive dialer is a system that generates outbound calls from a call center. Outbound calls that reach a live called party (i.e., a human being answers the call) are connected to call center agents for handling, i.e., servicing. Such answered calls for which no agent is immediately available to service them are referred to as nuisance calls. Nuisance calls are possible because the predictive dialer initiates calls without a priori assignment and connection of agents to the generated calls. Furthermore, because generated calls can go unanswered or may be answered by a machine as opposed to a live called party, the predictive dialer typically initiates more outbound calls than there are agents available to service them. With automatic call classification of whether or not, and by what, an outbound call has been answered, the call center determines the need for an agent only when the call is answered. The call center then attempts to match and connect the call answered by a live party to an individual agent for immediate servicing.

A call center has the conflicting objectives of minimizing agent idle time while minimizing the numbers of nuisance calls. But two characteristics of telephone calling are inherently problematic for agent utilization. The first is the long ring time required to reach a called party, and the second is a high incidence of call attempts that result in failure to connect to a live called party. Without predictive dialing, agents would spend considerable time waiting for ringing phones to be answered. When a ringing phone is not answered, the agent would have to wait again for results of the next call attempt. Predictive dialing attempts to reduce agent wait-times. However, that is not without risk of connecting to a called party without an agent being available to service the call.

In a predictive dialing environment, agents are presently unavailable because they are performing tasks that are designated to be un-interruptible. That is, an agent can do only one task at a time and cannot start a new task until the previous task is completed. Additionally, only one agent can usually be assigned to a particular task. The tasks typically involve live clients in a transaction, and background fulfillment tasks may be dynamically interspersed amongst them. Agents that are presently handling tasks are rendered unavailable. However, each unavailable agent can be expected to complete their task with a particular probability over a future time interval.

Predictive dialers use various methods and algorithms to systematically initiate calls before agents are available to handle them. Whatever is the basic method that a dialer employs, it attempts to achieve a balance between agent utilization and nuisance-call rates. Such balancing typically employs heuristics realized in the predictive dialer's dialing algorithm. However, it faces many dynamic and unsystematic variations in characteristics of the called population, characteristics of the calling campaign, spontaneous assignment of agents to other work, and inconsistent behavior of agents. These variations tend to upset any real balance between agent utilization and nuisance-call rates. The predictive methods alone do not sufficiently compensate for the unsystematic uncertainty in their predictive models. Either there is excessive agent idle time (detected as an excess service level), or there is lack of promptness in responding to called parties who answer (detected as an insufficient service level). A service level is a percentage or a ratio of those transactions out of all transactions that satisfy some criterion of "goodness."

Some predictive dialing systems employ feedback. The feedback typically includes agent's and call-handling characteristics and answer-delay results from the inexact matching of agents with calls answered by live called parties. However, these systems use feedback to directly speed up or slow down the rate of initiation of telephone calls, or they use feedback to update operating characteristics such as hit rate and handle time. Predictive dialing systems that directly change the dialing rate do not adapt appropriately, because the feedback should only effect a marginal adjustment to the predictive model. Changing the dialing rate is too discrete a change. Sometimes the incremental change is too much, sometimes it is too little, and sometimes the feedback results in severe instabilities in the dialing rate. Such performance is insufficient for controlling system operation to achieve very high service levels such as, for example, immediately connecting to an agent 99% of live called parties who answer.

Existing predictive dialing systems do not attempt to systematically subject themselves to marginally-greater risk of nuisance calls in favor of greater agent utilization while maintaining an objective measure of cumulative performance against nuisance-call rates.

SUMMARY OF THE INVENTION

This invention is directed to solving these and other problems and disadvantages of the prior art. It seeks to minimize agent idle time while ensuring compliance with limits on nuisance calls. The invention provides feedback regarding realized service level to dynamically change the aggressiveness of the predictive dialer, yet the basic predictive dialer and its methods of operation may remain unchanged. It employs adaptive control in the feedback of service-level error to ensure continual achievement of the service-level goal while effecting greater aggressiveness in the performance of the dialer to eliminate sustained accretion of excess agent wait-time. An illustrative embodiment of the invention employs three feedback loops external to the basic predictive dialer. One takes the cumulative service-level error and feeds it back into the dialing-aggressiveness setting for the predictive dialer, with variable-gain factors set to favor achieving the desired service level over achieving highest agent utilization. The second feedback loop feeds back the current magnitude of the margin in the number of nuisance calls, where the margin is defined as the number of calls requiring an agent that were immediately connected to an agent less the product of the number of calls requiring an agent and the desired service level. The third feedback loop employs exponential moving averages to get a calibration factor that is a ratio of nuisance calls to aggressiveness settings. This calibration factor is then used in the forward loop to dynamically calibrate the aggressiveness setting. The feedback of realized service-level error and the current margin entails a longer effective time-constant than does the calibration feedback. Consequently, appropriate dynamic adjustments for stability and controllability are isolated from direct adjustments for maintenance of restrictions on nuisance-call rates and maximization of agent utilization.

According to the invention, a method of controlling a predictive dialer comprises automatically determining a difference between a desired reference service level and a service level realized by calls that were initiated by the predictive dialer, automatically adjusting the reference service level for error represented by the determined difference, and automatically directing the predictive dialer to produce the adjusted reference service level. "Automatically" refers to these actions being done without involvement therein of a person. A corresponding apparatus comprises a predictive dialer for initiating calls and a feedback control for controlling operation of the predictive dialer through a first feedback loop that automatically determines a difference between a desired reference service level and a service level realized by calls that were initiated by the predictive dialer, automatically adjusts the reference service level for error represented by the determined difference, and automatically directs the predictive dialer to produce the adjusted reference service level.

Preferably, according to one aspect of the invention, the method involves repeating the above-mentioned steps over a time and automatically directing the predictive dialer to attenuate oscillations of the realized service level or to compensate for systematic errors. (Compensating for systematic errors also tends to reduce oscillations.) Also preferably, automatically directing the predictive dialer to attenuate oscillations or compensate for systematic errors comprises generating a calibration factor that is a function of the adjusted service levels which the predictive dialer was directed to produce over a time and a number of nuisance calls among the calls initiated by the predictive dialer over the time, and automatically directing the predictive dialer to produce the adjusted reference service level modified by the calibration factor. Generating a calibration factor illustratively comprises generating a ratio of (a) a sum of complements of said adjusted service levels modified by corresponding calibration factors and (b) the number of the nuisance calls. More specifically, generating a calibration factor illustratively comprises generating a ratio of (a) a sum of nuisance-call service levels modified by corresponding calibration factors and (b) the number of the nuisance calls, wherein each nuisance-call service level complements and varies inversely with a corresponding said adjusted service level, and automatically directing the predictive dialer comprises automatically directing the predictive dialer to produce a nuisance-call level corresponding to the adjusted reference service level and modified by the calibration factor.

Preferably, according to another aspect of the invention, the method involves repeating the initially-mentioned steps over time, and automatically directing the predictive dialer to keep oscillations of the realized service level above the reference service level. Also preferably, automatically directing the predictive dialer to keep oscillations of the realized service level above the reference service level comprises automatically determining over the time a margin by which calls initiated by the predictive dialer that are answered by persons (hits) and that are not nuisance calls (successes) exceed successes required over the time to achieve the reference service level, and varying a size of adjustment that the automatically adjusting the reference service level for the error makes in the reference service level, in direct relation to a size of the margin. Preferably according to this aspect of the invention, the method involves automatically determining a second difference between a number of calls initiated by the dialer that are answered by persons (hits) and that are not nuisance calls (successes) and a number of successes required to achieve the reference service level, and automatically adjusting the error for the second difference; wherein automatically adjusting the reference service level for error comprises automatically adjusting the reference service level for the adjusted error.

According to a third aspect of the invention, the method further involves repeating the initially-mentioned steps over time, and automatically directing the predictive dialer to compensate for realized nuisance-call rates relative to dialing aggressiveness settings of the predictive dialer. This preferably involves generating a gain factor that is a function of the adjusted reference service levels which the predictive dialer was directed to produce over a time and a number of nuisance calls among the calls initiated by the predictive dialer over the time, and automatically directing the predictive dialer to produce the adjusted reference service level compensated by the gain factor. The gain factor is preferably a ratio of (a) a sum of complements of the adjusted reference service levels compensated by corresponding said gain factors, and (b) the number of the nuisance calls. Alternatively, the gain factor is a ratio of (a) a sum of adjusted nuisance-call levels and (b) the number of the nuisance calls, wherein each adjusted nuisance-call level complements and varies inversely with a corresponding said adjusted reference service level, and automatically directing the predictive dialer to produce the adjusted reference service level compensated by the gain factor involves automatically directing the predictive dialer to produce a nuisance-call level corresponding to the adjusted reference service level and compensated by the gain factor.

According to a fourth aspect of the invention, a method of controlling a predictive dialer comprises repeatedly causing the predictive dialer to adjust its initiating of calls for a difference between a desired reference service level and a service level realized by calls that were initiated by the predictive dialer, repeatedly causing the predictive dialer to adjust the initiating of calls so as to compensate for realized nuisance-call rates relative to dialing aggressiveness settings of the predictive dialer, and repeatedly causing the predictive dialer to adjust the initiating of calls so that oscillations of the realized service level remain above the reference service level. A corresponding apparatus comprises a predictive dialer for initiating calls and a feedback control for controlling operation of the predictive dialer, comprising a first feedback loop that repeatedly causes the predictive dialer to adjust its initiating of calls for a difference between a desired reference service level and a service level realized by calls that were initiated by the predictive dialer, repeatedly causes the predictive dialer to adjust the initiating of calls so as to compensate for realized nuisance-call rates relative to dialing aggressiveness settings of the predictive dialer, and repeatedly causes the predictive dialer to adjust the initiating of calls so that oscillations of the realized service level remain above the reference service level.

According to a fifth aspect of the invention, a method of controlling a predictive dialer comprises repeatedly causing the predictive dialer to adjust its initiating of calls for a difference between a desired reference service level and a service level realized by calls that were initiated by the predictive dialer, repeatedly causing the predictive dialer to adjust the initiating of calls so as to damp oscillations of the realized service level or compensate for systematic errors, and repeatedly causing the predictive dialer to adjust the initiating of calls so that oscillations of the realized service level remain above the reference service level. A corresponding apparatus comprises a predictive dialer for initiating calls and a feedback control for controlling operation of the predictive dialer, comprising a first feedback loop for repeatedly causing the predictive dialer to adjust the initiating of calls for a difference between a desired reference service level and a service level realized by calls that were initiated by the predictive dialer, a second feedback loop for repeatedly causing the predictive dialer to adjust the initiating of calls so as to attenuate oscillations of the realized service level or compensate for systematic errors, and a third feedback loop for repeatedly causing the predictive dialer to adjust the initiating of calls so that oscillations of the realized service level remain above the reference service level. Preferably, the method comprises determining a realized service level corresponding to a ratio of a number of calls initiated over a time by the predictive dialer that are answered by a person (hits) and a number of the hits that are not nuisance calls (successes), determining a scaled first difference between a desired reference service level and the realized service level, determining a scaled second difference between the number of successes and a number of successes required to achieve the reference service level, adjusting the reference service level for the scaled first difference and the scaled second difference to yield a presently-desired service level, determining a calibration factor corresponding to a ratio of (a) a sum over a time of presently-desired nuisance-call levels modified by the calibration factor, wherein the presently-desired nuisance-call levels over the time correspond to and complement the presently-desired service levels over that time, and (b) a sum over the time of the nuisance calls, modifying the presently-desired nuisance-call level corresponding to the presently-desired service level by the calibration factor to obtain a calibrated said presently-desired nuisance-call level, and directing the predictive dialer to produce a calibrated presently-desired service level corresponding to the calibrated presently-desired nuisance-call level. A corresponding apparatus comprises a predictive dialer for initiating calls, and a feedback control for controlling operation of the predictive dialer, that determines a realized service level corresponding to a ratio of a number of calls initiated over a time by the predictive dialer that are answered by a person (hits) and a number of the hits that are not nuisance calls (successes), determines a scaled first difference between a desired reference service level and the realized service level, determines a scaled second difference between the number of successes and a number of successes required to achieve the reference service level, adjusts the reference service level for the scaled first difference and the scaled second difference to yield a presently-desired service level, determines a calibration factor corresponding to a ratio of (a) a sum over a time of presently-desired nuisance-call levels modified by the calibration factor, wherein the presently-desired nuisance-call levels over the time correspond to and complement the presently-desired service levels over the time, and (b) a sum over the time of the nuisance calls, modifies the presently-desired nuisance-call level corresponding to the presently-desired service level by the calibration factor to obtain a calibrated said presently-desired nuisance-call level, and directs the predictive dialer to produce a calibrated presently-desired service level corresponding to the calibrated presently-desired nuisance-call level.

The feedback system illustratively functions even without detailed knowledge of the basic predictive dialing method. It adapts to changing conditions, it compensates for simplifications in the basic predictive dialing model, and it compensates for unsystematic behavior in the agents and the called population.

The invention preferably favors achieving a target service-level over achieving a balance between the service level and agent utilization. It considers the service-level constraint to be of the utmost importance with respect to the control of the aggressiveness of the predictive dialer. While it supports the realization of high service-levels and high utilization simultaneously, it preferably maximizes agent utilization only within the constraint of the target service-level being achieved.

The invention may be used to improve customer service and reduce the burden on supervision in call centers. It can be employed to enable call centers to meet stringent regulatory limits or even prohibitions on nuisance calls. The invention eliminates the need for manual interventions in the performance of a predictive dialer and eliminates wasted sustained excessively-conservative performance of the dialer. It takes advantage of existing predictive-dialing arrangements while enhancing the performance that they deliver.

The invention includes both a method as well as a corresponding apparatus for performing the method, and a computer-readable medium that contains instructions which, when executed in a computer, cause the computer to perform the method. The apparatus preferably includes an effector—any entity that effects the corresponding steps, unlike a means—for each method step.

BRIEF DESCRIPTION OF THE DRAWING

These and other features and advantages of the invention will become more apparent from the following description of an illustrative embodiment of the invention considered together with the drawing, in which.

DETAILED DESCRIPTION OF AN ILLUSTRATIVE EMBODIMENT

Reference will now be made in detail to the illustrative embodiment of the invention, which is illustrated in the accompanying drawing. While the invention will be described in conjunction with the illustrative embodiment, it will be understood that it is not intended to limit the invention to this embodiment. On the contrary, the invention is intended to cover alternatives, modifications, and equivalents, which may be included within the invention as defined by the appended claims.

Figure 1:
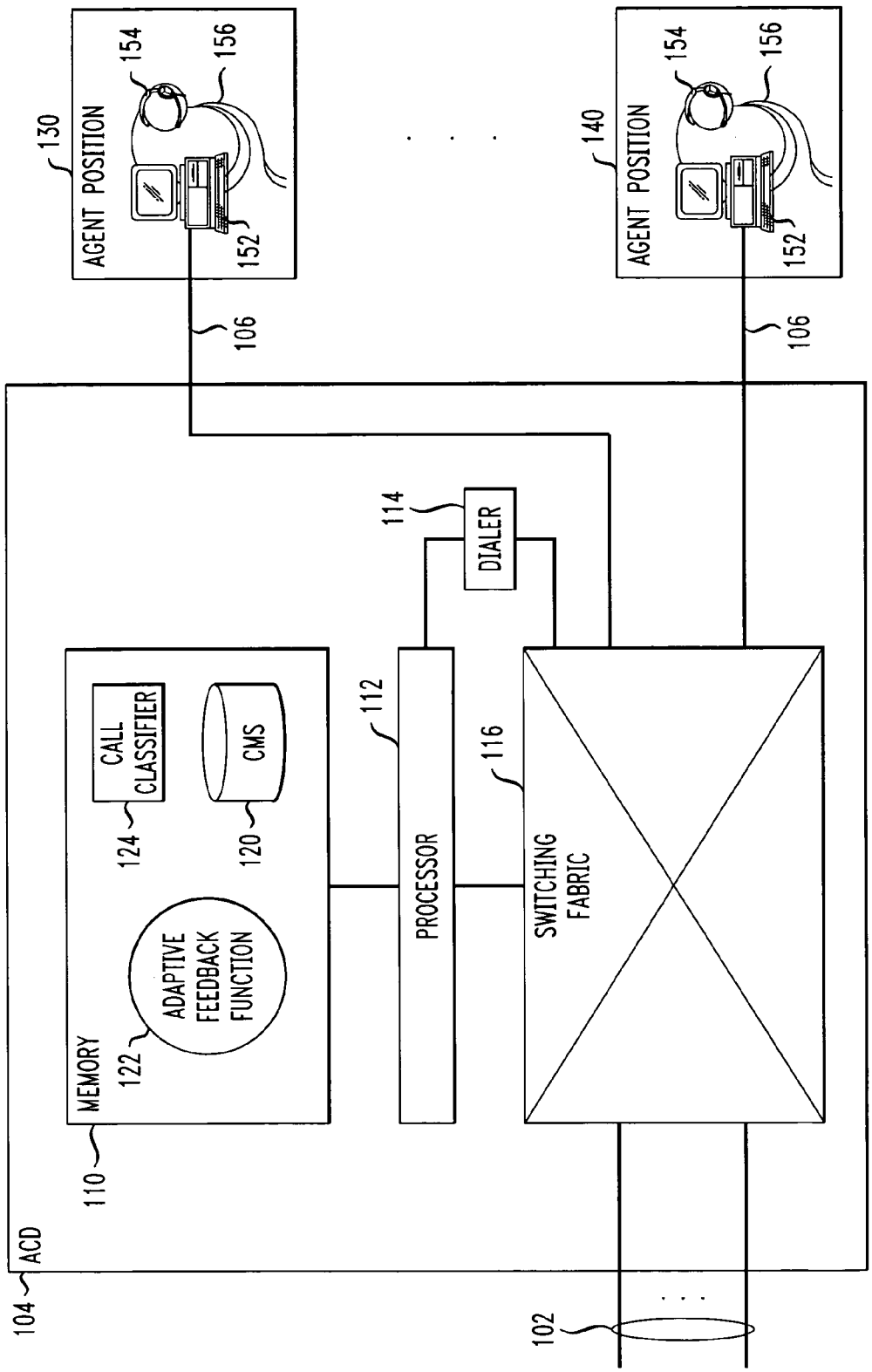
FIG. 1 is a block diagram of a call center that includes an illustrative embodiment of the invention.

FIG. 1 shows an illustrative call center 100 for servicing inbound and outbound calls. Call center 100 comprises an automatic call distributor (ACD) 104 that interconnects agent positions 130-140 via calls with the outside world to which it is connected by communications trunks 102. ACD 104 includes a switching fabric 116 that selectively interconnects trunks 102 with communications lines 106 that extend to agent positions 130-140. ACD 104 is a stored program-controlled apparatus that operates under control of a processor 112 that obtains and stores data in, and executes stored programs out of, memory 110 or any other computer-readable medium. Programs in memory 110 include a call classifier which analyzes the signals on a call connection to distinguish control signals from other signals (e.g., voice, music) and to determine their meaning. Data in memory 110 include historical and operational data of ACD 104 and agents 156, which are stored in a call management system (CMS) 120 database. Processor 112 controls operation of switching fabric 116 and of a dialer 114 that generates outgoing calls on trunks 102 through switching fabric 116. Each agent position 130-140 includes a terminal 152, such as a personal computer, and a voice communications device, such as a telephone or a headset 154, for use by an agent 156. As described so far, call center 100 is conventional.

For purposes of the following discussion, a call, whether incoming or outgoing, constitutes a task to be served, and an agent position 130-140 that is presently staffed by an agent 156 constitutes a resource for serving tasks.

According to an illustrative embodiment the invention, memory 110 of ACD 104 includes an adaptive feedback function 122. Function 122 could alternatively be included and executed either in dialer 114 or on an adjunct processor (not shown) connected to ACD 104. While implemented in software in the illustrative embodiment of FIG. 1, function 122 could likewise be implemented in hardware or firmware.

Figure 2:
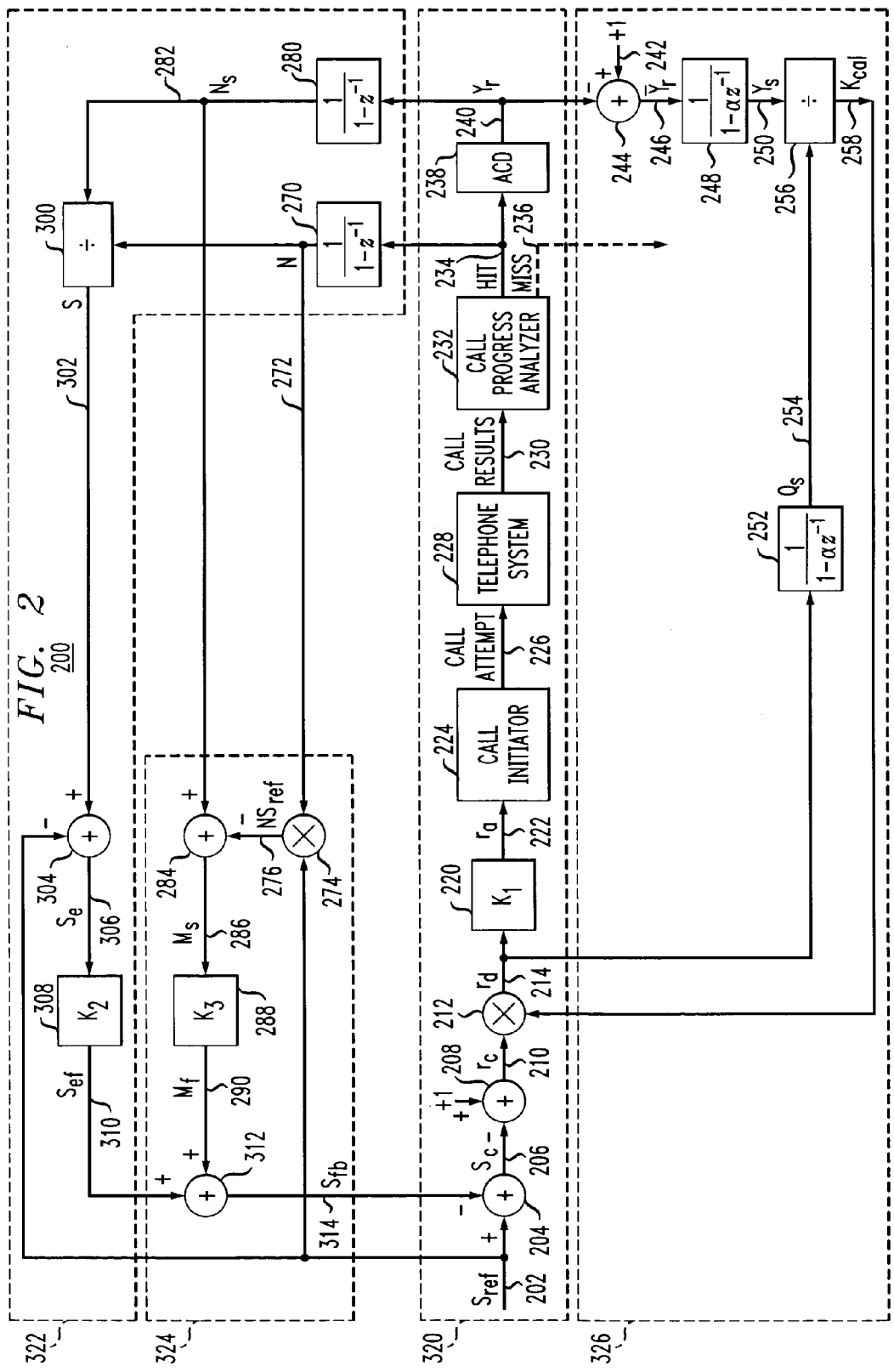
FIG. 2 is a block diagram of a feedback control system of a predictive dialer of the call center of FIG. 1

Function 122 together with ACD 104 implements an adaptive feedback system 200 shown in FIG. 2. In FIG. 2, call initiator 224 represents dialer 114 of FIG. 1, telephone system 228 is partly represented in FIG. 1 by switching fabric 116 and trunks 102, call progress analyzer 232 represents call classifier 124 of FIG. 1, and ACD 238 represents ACD 104 of FIG. 1. The remainder of FIG. 2 represents function 122. Function 122 is preferably executed before performing any new call initiation.

This diagram represents conceptual and parametric elements of system 200. Each block represents a transfer function that processes its input to produce an output as in a classical block diagram for a feedback control system.

System 200 illustratively consists of four main parts 320-326. A forward path 320 feeds an input that is representative (a function) of the desired minimum service level to predictive dialer 114. This input affects the operation of predictive dialer 114 with a view to achieving the desired minimum service level. A service level feedback loop 322 feeds a correction for the error in the service-level realized by the system of FIG. 1 back into forward path 320. The service-level error is representative of the difference between the desired minimum service level and the realized service level.

Service-level feedback loop 322 may cause the realized service level to converge to the desired service level over time, but then over short periods of time, it is unstable, causing oscillations of the realized service level. A calibration feedback loop 326 provides attenuation of those oscillations. The amount of attenuation exerted by loop 326 is a function of the ratio of (a) the (smoothed) sum of nuisance-call level (i.e., the ratio of the number nuisance calls and the number of calls answered by a live party (hits)) over a time and (b) the (smoothed) sum of nuisance calls realized by the system of FIG. 1 over that time.

Contrariwise, service-level feedback loop 322 may fail to cause any substantial movement of the realized service level toward the desired service level due to systematic error in the aggressiveness of the dialer. Calibration feedback loop 326 provides compensation for that systematic error in the dialer. A systematic error is a bias in the system; it is a persistent error that is not determined by chance but is introduced by an inaccuracy inherent in the system. The amount of compensation exerted by loop 326 for systematic error is also a function of the ratio of (a) the (smoothed) sum of nuisance-call levels over a time and (b) the (smoothed) sum of nuisance calls realized by the system of FIG. 1 over that time.

While feedback loops 322 and 326 cause the realized service level to tend toward the desired service level, they do not ensure that the realized service level does not fall below the desired service level and they do not ensure that the realized service level converges to the desired service level. This is the function of a margin feedback loop 324. Margin feedback loop 324 provides feedback into forward loop 320 as a function of the amount, referred to as the "margin of success," by which the actual number of non-nuisance hits (successes) realized over time differs from the number of successes needed to just meet the desired service level.

Forward Path 320

The forward path of system 200 begins with the input of a reference service level $S_{ref}$ 202. $S_{ref}$ is the minimum acceptable ratio of the number of calls that are answered by a live party and immediately connected to an agent to the total number of calls that are answered by a live party. Another way of expressing $S_{ref}$ is one minus the maximum acceptable ratio of nuisance calls to the total number of calls that are answered by a live party. Reference service level 202 is the minimum acceptable realized service level. It is the specified desired service level against which system 200 compares its realized service level to determine the magnitude and direction of service-level errors. An operator of the system of FIG. 1 sets the value of $S_{ref}$ 202 for a particular calling job ("campaign") based on policies and regulations that may depend upon the type of calling job, including the reason for the calls and the characteristics of the called population. $S_{ref}$ 202 is usually expressed as a value without units, less than 1 and greater than zero. Typically, it would be close to 0.99. System 200 considers it to be constant.

$S_{ref}$ 202 is decremented by an aggregate feedback value $S_{fb}$ 314 at a summing block 204 to obtain a command service level $S_c$ 206. $S_c$ 206 is an adjusted service level, the presently-desired service level for future call initiations. $S_c$ 206 is usually expressed as a value without units, less than 1 and greater than zero. $S_c$ 206 varies with changes in realized service level and the margin of success. In order to avoid a computed command service level of greater than 1, $S_c$ 206 can be determined by $$S_c = 1 - \frac{(1 - S_{ref})^2}{1 - S_{ref} - S_{fb}} \text{ when } S_{fb} < 0.$$

Command service level $S_c$ 206 is subtracted from a value of one at a summing block 208 to obtain a command queue rate $r_c$ 210. $r_c$ 210 is the presently-desired nuisance-call level, i.e., a ratio of nuisance calls to hits. $r_c$ 210 is the complement of command service level $S_c$ 206. If the actually realized service level exceeds $S_{ref}$ 202, then $r_c$ 210 needs to be increased; if $S_{ref}$ 202 exceeds the realized service level, then $r_c$ 210 needs to be decreased. $r_c$ 210 is usually expressed as a value without units, less than 1 and greater than zero. It varies with changes in the realized service level.

Command queue rate $r_c$ 210 is modified by a calibration factor $K_{cal}$ 258 at a multiplier block 212 to obtain an adjusted queue rate $r_d$ 214. $K_{cal}$ 258 is the calibration factor for recently-realized rates of nuisance calls compared with commanded rates of nuisance calls to attenuate oscillations of the realized service level or to compensate for systematic error in the dialing aggressiveness of the predictive dialer. $K_{cal}$ 258 is usually expressed as a value without units greater than zero. It varies with changes in realized service level and nuisance-call rates.

Adjusted queue rate $r_d$ 214 is converted into a dialing aggressiveness ratio $r_a$ 222 by a gain transfer function 220. A gain factor $K_1$ of function 220 is a scaling factor that transforms the adjusted queue rate $r_d$ 214 into the dialing aggressiveness ratio $r_a$ 222 that is understood by call initiator 224 (the basic predictive dialer 114). $K_1$ is greater than zero. It should be one in the case where dialer 114 accepts an aggressiveness setting that represents a nuisance-call rate or that represents the probability of a nuisance call. The gain factor $K_1$ can be determined by a more complicated transfer function appropriate to a particular dialer 114. However, that is not necessary for feedback system 200 to work.

A predictive dialer uses the aggressiveness ratio to determine when to initiate new call attempts. A predictive dialer's aggressiveness ratio sets a measure for controlling agent utilization, for controlling availability of agents to handle called parties, or for balancing between agent utilization and agent availability. The aggressiveness ratio can be a ratio of time durations or a ratio of counts or a probability or a percentile or some other unit-less measure. A value of zero is the least aggressive (least agent utilization), while a value of 1 is the most aggressive.

In one implementation of a predictive dialer, the aggressiveness ratio gives a percentile of agent time spent handling a call or wrapping up a call. For dialing based on handle time, the dialer automatically builds a histogram of time durations for handling calls. The dialer determines a percentile by subtracting the aggressiveness ratio from one, and then it determines at what point on the time axis the cumulative histogram evaluates to the percentile value. That time value gives the trigger time for considering that the agent will be available. When any agent has been handling a call for longer than that amount of time, the agent is considered to be already available. Similarly, for dialing based on wrap-up time, the dialer builds a histogram of time duration for wrapping up calls, determines the percentile by subtracting the aggressiveness ratio from one, and then determines at what time a value of the cumulative wrap-up time histogram evaluates to the percentile. When any agent has been wrapping up a call for longer than that trigger time, the agent is considered to be already available. Another implementation of a predictive dialer uses a probability that no agent will be available to connect to a call when a live party answers.

Another implementation of a predictive dialer uses as the aggressiveness ratio a ratio of the expected wait-time for called parties to the sum of the expected wait-time for agents and the expected wait-time for called parties in an effort to establish a balance between agent idle-time and call queue-time. Yet another predictive dialer implementation uses the aggressiveness ratio to adjust the hit rate. When the aggressiveness ratio is one, the hit rate is taken at face value, and as the aggressiveness ratio approaches zero, the hit rate is taken as one. The formula Kr+1−K gives the adjusted hit rate where r is the measured hit rate and K is the aggressiveness ratio.

Dialing aggressiveness ratio $r_a$ 222 is the input to call initiator 224. As was already mentioned, call initiator 224 is the predictive dialer 114. $r_a$ 222 should be identical to the adjusted command queue rate $r_d$ 214 in the case where call initiator 224 accepts an aggressiveness setting that represents a nuisance-call rate or a probability of a nuisance call. Call initiator 224 uses aggressiveness ratio $r_a$ 222 to determine when to initiate new call attempts. There are a variety of other parameters and characteristics that it uses that are external and unrelated to feedback control system 200. The output of call initiator 224 at any time is either nothing or a command 226 to a telephone system 228 (e.g., switching fabric 116 of FIG. 1) to initiate a telephone call. Call initiator 224 is a part of the plant under control.

Telephone system 228 responds to call attempt command 226 in a conventional manner by initiating and routing a call from ACD 104 of FIG. 1 to a called party. Called parties are considered to be part of telephone system 228 for the purpose of FIG. 2. Telephone system 228 can be a data network or use elements of a data network such as the Internet. Telephone system 228 is a part of the plant under control. Telephone system 228 generates call results 230. Call results 230 are the net result of the call attempt With regard to whether the call requires connection to an agent or whether the call should be terminated. For example, a "calling party busy" result would not require connection to an agent. Voice detection by call classifier 124 of FIG. 1 could possibly require an agent, while a detection of a live caller answer (not an answering machine) normally always requires connection to an agent.

A call progress analyzer 232 (e.g., the call classifier 124 of FIG. 1) listens to the call attempt to determine when and if there is an answer or other result and to dynamically classify the result. Specifically, call progress analyzer 232 determines whether or not the call resulted in a hit (a call answer that requires connection of the call to an agent) or a miss (not needing connection to an agent), and generates a corresponding output signal 234 or 236, respectively. Call progress analyzer 232 does this quite quickly so as not to lose a called party before an agent 130-140 can begin conversation with the called party. Call progress analyzer 232 is a part of the plant under control.

While feedback system 200 does not process misses 236, they would be used in predictive dialer 114 to determine hit rates and to determine if the failed attempt should be replaced by a new attempt. In contrast, feedback system 200 does process hits 234. Hits 234 are input to ACD 238. ACD 238 matches hits with agents 130-140 and connects agents 130-140 to the called parties. It typically maintains a queue of waiting agents 130-140, and may maintain a queue of waiting called parties. ACD 238 detects instances of calls that are distributed to agents 130-140 without too much delay and also detects instances of calls that are distributed too late or that are abandoned either by the system or by the called party. ACD 238 is a part of the plant under control. ACD 238 generates a discrete output $Y_r$ 240 that is zero when the result of a hit 234 is a nuisance call and that is one when the result of a hit 234 is not a nuisance call.

Service Level Feedback Loop 322

The purpose of the service level feedback loop is to steer the realized service level above yet toward the minimum acceptable service level $S_{ref}$ 202, i.e., to cause convergence of the realized service level to $S_{ref}$ 202.

The feedback loop uses $Y_r$ 240 to compute a number of successes $N_s$ 282 at a transfer function 280. Number of successes $N_s$ 282 is the simple sum of the values of instances of $Y_r$ 240. It is the number of times that the system distributed calls to agents 130-140 without excessive delay. Transfer function 280 is expressed as $$\frac{1}{1-z^{-1}}$$

because it is a z-transform representing a generator of the sum of discrete values. System 200 should initialize $N_s$ 282 to zero or to the value of the product of $S_{ref}$ 202 and the initial value of the number of hits N 272, as described below.

Returning to block 232, not only are hits 234 input to ACD 238, they are also input to a transfer function 270 where each hit increments a total number of hits N 272 realized so far in the calling job. Number of hits N 272 is incremented at the same time as the call distribution result $Y_r$ 240 is processed. Number of hits N 272 is incremented when the call is distributed to an agent 130-140 or when it is determined to be a nuisance call. Transfer function 270 is expressed as $$\frac{1}{1-z^{-1}}$$

because it is a z-transform representing a generator of the sum of discrete values. System 200 should initialize N 272 to a small value greater than zero, such as one. This enables a later division that would otherwise prove to be impossible. However, the initial value of this parameter relative to the initial value of number of successes $N_s$ 282 can introduce a bias in the computation of the realized service level.

Number of success $N_s$ 282 is divided by number of hits N 272 at block 300 to obtain a cumulative realized service level S 302. This is the service level that is actually being achieved by the system of FIG. 1. This ratio may be biased somewhat depending upon initial values chosen for the number of hits N 272 and the number of successes $N_s$ 282. Alternatively, system 200 could designate the value of the service level where the number of hits N 272 is zero and in the case where there is a zero initial value for the number of hits N 272. Typically, this designated value of S 302 would be made equal to the value of minimum service level $S_{ref}$ 202.

Minimum service level $S_{ref}$ 202 is subtracted from the cumulative realized service level S 302 at summing block 304 to obtain the service level error $S_e$ 306. Gain factor $K_2$ is then applied to $S_e$ 306 at block 308 to obtain a service level error feedback value $S_{ef}$ 310. Gain factor $K_2$ is a scaling factor that is applied to service level error $S_e$ 306 to compensate for the error in realized service level for future call initiations. $K_2$ can vary with different parameters. For example, it could be four when service level error $S_e$ 306 is not positive, and it could be 0.5 when service level error $S_e$ 306 is positive. It could gradually increase with the number of successes in excess of the product of the number of hits N 272 and $S_{ref}$ 202 so as to gradually reduce the cumulative error in service level to approach the reference service level $S_{ref}$ 202. The output $S_{ef}$ 310 is the feedback for service level error, which is a component of the feedback compensation into the forward loop.

Margin Feedback Loop 324

The purpose of the margin feedback loop of system 200 is to force the realized service level to converge over time to the minimum-acceptable, reference, service level $S_{ref}$ 202, while precluding the realized service level from dropping below the reference service level.

The margin feedback loop multiples $S_{ref}$ 202 by the number of hits N 272 at a multiplier block 274 and subtracts the result $NS_{ref}$ 276 from the number of successes $N_s$ 282 at a summing block 284 to obtain a margin of success $M_s$ 286. $M_s$ 286 is the excess number of successful distributions of calls to agents over the number required to meet the service level $S_{ref}$ 202 for the current number of hits. $M_s$ 286 is computed as the number of successes $N_s$ 282 less the product $NS_{ref}$ 276 of the number of hits N 272 and the reference service level $S_{ref}$ 202. $M_s$ 286 is an error to be controlled in order to reduce cumulative service level error close to the reference service level $S_{ref}$ 202. $M_s$ 286 changes by $1-S_{ref}$ for each success and changes by $-S_{ref}$ for each call that does not meet the criterion for a good distribution to an agent.

A gain factor $K_3$ is applied to $M_s$ 286 at block 288 to obtain a margin feedback $M_f$ 290. Margin feedback $M_f$ 290 is the product of a gain factor $K_3$ and $M_s$ 286. Gain factor $K_3$ determines the compensation commensurate with $M_s$ 286 for the error in the number of successes. To avoid oscillations, this factor should be much less than the granularity desired in controlling the realized service level. For example, when one wants to control service level to 0.1% accuracy or magnitude of error, then $K_3$ could be 0.0001.

$M_f$ 290 is summed with service level error feedback $S_{ef}$ 310 at a summing block 312 to yield aggregate feedback $S_{fb}$ 314. $S_{fb}$ 314 feeds into the forward loop at summing block 204 to affect the command service level $S_c$ 206.

Queue Rate Calibration Feedback Loop 326

The purpose of the calibration feedback loop of system 200 is to adapt the commanded queue rate $r_c$ 210 based on realized results compared with command inputs to compensate for bias and other systematic errors in the predictive dialer and possibly attenuate oscillations in the realized service level.

$Y_r$ 240 is subtracted from one at summing block 244 to yield $\overline{Y}_r$ 246. The feedback loop uses $\overline{Y}_r$ 246 to compute a smoothed number of nuisance calls $Y_s$ 250 at a transfer function 248. Smoothed number of nuisance calls $Y_s$ 250 is a sum of discrete weighted instances of the occurrence of nuisance calls wherein for each instance of a nuisance call a one is accumulated, and for each instance of a "success" a zero is accumulated. Furthermore, each time an instance is accumulated, the previous sum is discounted by multiplying by the smoothing constant alpha ($\alpha$). Consequently, at instance n, the previous instance n-m has a weight of $\alpha^m$ while the current instance n has a weight of one. The process progressively discounts instances with age. Transfer function 248 is expressed as $$\frac{1}{1-\alpha z^{-1}}$$

because it is a z-transform representing a generator of the exponentially-smoothed sum of discrete values. System 200 should initialize $Y_s$ 250 to a value much greater than the reciprocal of the granularity desired for control of the service level. For example, if one wants to control to a service level greater than 0.99, then the initial value of $Y_s$ 250 should be about $$\frac{1}{1-0.99} = 100.$$

The smoothing constant a is less than one and greater than zero. Generally, it should be greater than the square root of the reference service level $S_{ref}$ 202, i.e. $1 > \alpha > \sqrt{S_{ref}}$. In addition, it should have an instance half-life at least as big as the agent pool, i.e. $1 > \alpha 2^{-n^{-1}}$ where n is the number of agents 130-140 in the pool. One might also want the smoothing constant to increase with the volume of calls processed. A suggested value is α=2 to the power $(-1/(n+(8/(1-S_{ref}))))$ where n is the cumulative number of hits experienced in the campaign. For example, with $$S_{ref} = 0.99 \text{ and } n = 0, \frac{8}{1-S_{ref}} = \frac{8}{1-0.99} = \frac{8}{0.01} = 800,$$

so the smoothing constant is $$\alpha = 2^{\frac{1}{800}} = 2^{-0.00125} = \frac{1}{2^{0.00125}} = \frac{1}{1.00086681} = 0.999134.$$

Alternatively, n may be the number of agents 130-140.

Adjusted queue rate $r_d$ 214 is used to compute a smoothed sum of adjusted queue rates $Q_s$ 254 at a transfer function 252. Values of $r_d$ 214 are sampled when a call is initiated and they are accumulated when the associated connect demand is classified as a nuisance or a success (i.e., when the associated call result is accumulated into the smoothed number of nuisance calls). Furthermore, each time a sample is accumulated, the previous sum is discounted by multiplying by the smoothing constant α. Consequently, at instance n, the previous instance n-m has a weight of $\alpha^m$ while the current instance n has a weight of one. The process progressively discounts the samples with age. α at block 252 is identical to α at block 248. Transfer function 252 is expressed as $$\frac{1}{1-\alpha z^{-1}}$$

because it is a z-transform representing a generator of the exponentially-smoothed sum of discrete values. For unbiased initial behavior, the system should initialize $Q_s$ 254 to the same value as the initial value of $Y_s$ 250.

$Q_s$ 254 is divided by $Y_s$ 250 at division block 256 to obtain a calibration ratio $K_{cal}$ 258. $K_{cal}$ 258 is fed back into the forward loop at multiplication block 212.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims except insofar as limited by the prior art.

What is claimed is:

1. A method of controlling a predictive dialer, comprising:
automatically determining a difference between a desired reference service level and a service level realized by calls that were initiated by the predictive dialer;
automatically adjusting the reference service level for error represented by the determined difference; and
automatically directing the predictive dialer to produce the adjusted reference service level, to converge the realized service level to the desired reference service level.

2. The method of claim 1 further comprising:
repeating the steps of claim 1 over a time; and
automatically directing the predictive dialer to attenuate oscillations of the realized service level or to compensate for systematic errors.

3. The method of claim 2 wherein:
automatically directing the predictive dialer to attenuate oscillations or to compensate for systematic errors comprises
generating a calibration factor that is a function of the adjusted service levels which the predictive dialer was directed to produce over a time and a number of nuisance calls among the calls initiated by the predictive dialer over the time, and
automatically directing the predictive dialer to produce the adjusted reference service level modified by the calibration factor.

4. The method of claim 3 wherein:
generating a calibration factor comprises
generating the calibration factor as a ratio of (a) a sum of complements of the adjusted service levels modified by corresponding said calibration factors and (b) the number of the nuisance calls.

5. The method of claim 3 wherein:
generating a calibration factor comprises
generating the calibration factor as a ratio of (a) a sum of nuisance-call service levels modified by corresponding calibration factors and (b) the number of the nuisance calls, wherein each nuisance-call service level complements and varies inversely with a corresponding said adjusted service level, and
automatically directing the predictive dialer comprises
automatically directing the predictive dialer to produce a nuisance-call level corresponding to the adjusted reference service level and modified by the calibration factor.

6. The method of claim 1 further comprising:
repeating the steps of claim 1 over time, and
automatically directing the predictive dialer to keep oscillations of the realized service level above the reference service level.

7. The method of claim 6 wherein:
automatically directing the predictive dialer to keep oscillations of the realized service level above the reference service level comprises
automatically determining over the time a margin by which calls initiated by the predictive dialer that are answered by persons (hits) and that are not nuisance calls (successes) exceed successes required over the time to achieve the reference service level, and
varying a size of adjustment, that the automatically adjusting the reference service level for the error makes in the reference service level, in direct relation to a size of the margin.

8. The method of claim 1 further comprising:
automatically determining a second difference between a number of calls initiated by the dialer that are answered by persons (hits) and that are not nuisance calls (successes) and a number of successes required to achieve the reference service level, and
automatically adjusting the error for the second difference; wherein
automatically adjusting the reference service level for error comprises
automatically adjusting the reference service level for the adjusted error.

9. The method of claim 1 further comprising:
repeating the steps of claim 1 over a time; and
automatically directing the predictive dialer to compensate for realized nuisance-call rates relative to dialing aggressiveness settings of the predictive dialer.

10. The method of claim 9 wherein:
automatically directing the predictive dialer to compensate for realized nuisance-call rates relative to the dialing aggressiveness settings comprises generating a gain factor that is a function of the adjusted reference service levels which the predictive dialer was directed to produce over a time and a number of nuisance calls among the calls initiated by the predictive dialer over the time, and automatically directing the predictive dialer to produce the adjusted reference service level compensated by the gain factor.

11. The method of claim 10 wherein:

generating a gain factor that is a function of the adjusted reference service levels and a number of nuisance calls comprises generating the gain factor that is a ratio of (a) a sum of complements of the adjusted reference service levels compensated by corresponding said gain factors and (b) the number of the nuisance calls.

12. The method of claim 10 wherein:

generating the gain factor that is a function of the adjusted reference service levels and a number of nuisance calls comprises generating the gain factor as a ratio of (a) a sum of adjusted nuisance-call levels and (b) the number of the nuisance calls, wherein each adjusted nuisance-call level complements and varies inversely with a corresponding said adjusted reference service level, and automatically directing the predictive dialer to produce the adjusted reference service level compensated by the gain factor comprises automatically directing the predictive dialer to produce a nuisance-call level corresponding to the adjusted reference service level and compensated by the gain factor.

13. A method of controlling a predictive dialer comprising:

repeatedly causing the predictive dialer to adjust its initiating of calls for a difference between a desired reference service level and a service level realized by calls that were initiated by the predictive dialer;

repeatedly causing the predictive dialer to adjust the initiating of calls so as to compensate for realized nuisance-call rates relative to dialing aggressiveness settings of the predictive dialer; and repeatedly causing the predictive dialer to adjust the initiating of calls so that oscillations of the realized service level remain above the reference service level.

14. A method of controlling a predictive dialer comprising:

repeatedly causing the predictive dialer to adjust its initiating of calls for a difference between a desired reference service level and a service level realized by calls that were initiated by the predictive dialer, to converge the realized service level to the desired reference service level;

repeatedly causing the predictive dialer to adjust the initiating of calls so as to attenuate oscillations of the realized service level or to compensate for systematic errors; and repeatedly causing the predictive dialer to adjust the initiating of calls so that oscillations of the realized service level remain above the reference service level.

15. A method of controlling a predictive dialer comprising:

determining a realized service level corresponding to a ratio of a number of calls initiated over a time by the predictive dialer that are answered by a person (hits) and a number of the hits that are not nuisance calls (successes);

determining a scaled first difference between a desired reference service level and the realized service level;

determining a scaled second difference between the number of successes and a number of successes required to achieve the reference service level;

adjusting the reference service level for the scaled first difference and the scaled second difference to yield a presently-desired service level;

determining a calibration factor corresponding to a ratio of (a) a sum over a time of presently-desired nuisance-call levels modified by the calibration factor, wherein the presently-desired nuisance-call levels over the time correspond to and complement the presently-desired service levels over that time, and (b) a sum over the time of the nuisance calls;

modifying the presently-desired nuisance-call level corresponding to the presently-desired service level by the calibration factor to obtain a calibrated said presently-desired nuisance-call level; and directing the predictive dialer to produce a calibrated presently-desired service level corresponding to the calibrated presently-desired nuisance-call level.

16. A computer-readable medium containing executable instructions which, when executed in a computer, cause the computer to perform the method of:

determining a difference between a desired reference service level and a service level realized by calls that were initiated by a predictive dialer;

adjusting the reference service level for error represented by the determined difference; and directing the predictive dialer to produce the adjusted reference service level, to converge the realized service level to the desired reference service level.

17. The medium of claim 16 wherein:

the method further comprises repeating over a time the steps recited in claim 16; and directing the predictive dialer to attenuate oscillations of the realized service level or to compensate for systematic errors.

18. The medium of claim 17 wherein:

directing the predictive dialer to attenuate oscillations or to compensate for systematic errors comprises generating a calibration factor that is a function of the adjusted service levels which the predictive dialer was directed to produce over a time and a number of nuisance calls among the calls initiated by the predictive dialer over the time, and directing the predictive dialer to produce the adjusted reference service level modified by the calibration factor.

19. The medium of claim 18 wherein:

generating a calibration factor comprises generating the calibration factor as a ratio of (a) a sum of complements of the adjusted service levels modified by corresponding said calibration factors and (b) the number of the nuisance calls.

20. The medium of claim 18 wherein:

generating a calibration factor comprises generating the calibration factor as a ratio of (a) a sum of nuisance-call service levels modified by corresponding calibration factors and (b) the number of the nuisance calls, wherein each nuisance-call service level complements and varies inversely with a corresponding said adjusted service level, and directing the predictive dialer comprises directing the predictive dialer to produce a nuisance-call level corresponding to the adjusted reference service level and modified by the calibration factor.

21. The medium of claim 16 wherein:
the method further comprises
repeating over a time the steps recited in claim 16, and
directing the predictive dialer to keep oscillations of the realized service level above the reference service level.

22. The medium of claim 21 wherein:
directing the predictive dialer to keep oscillations of the realized service level above the reference service level comprises
determining over the time a margin by which calls initiated by the predictive dialer that are answered by persons (hits) and that are not nuisance calls (successes) exceed successes required over the time to achieve the reference service level, and
varying a size of adjustment, that the automatically adjusting the reference service level for the error makes in the reference service level, in direct relation to a size of the margin.

23. The medium of claim 16 wherein:
the method further comprises
determining a second difference between a number of calls initiated by the dialer that are answered by persons (hits) and that are not nuisance calls (successes) and a number of successes required to achieve the reference service level, and
adjusting the error for the second difference; wherein
adjusting the reference service level for error comprises adjusting the reference service level for the adjusted error.

24. The medium of claim 16 wherein:
the method further comprises
repeating over a time the steps recited in claim 16; and
directing the predictive dialer to compensate for realized nuisance-call rates relative to dialing aggressiveness settings of the predictive dialer.

25. The medium of claim 24 wherein:
directing the predictive dialer to compensate for realized nuisance-call rates relative to the dialing aggressiveness settings comprises
generating a gain factor that is a function of the adjusted reference service levels which the predictive dialer was directed to produce over a time and a number of nuisance calls among the calls initiated by the predictive dialer over the time, and
directing the predictive dialer to produce the adjusted reference service level compensated by the gain factor.

26. The medium of claim 25 wherein:
generating a gain factor that is a function of the adjusted reference service levels and a number of nuisance calls comprises
generating the gain factor that is a ratio of (a) a sum of complements of the adjusted reference service levels compensated by corresponding said gain factors and (b) the number of the nuisance calls.

27. The medium of claim 25 wherein:
generating the gain factor that is a function of the adjusted reference service levels and a number of nuisance calls comprises
generating the gain factor as a ratio of (a) a sum of adjusted nuisance-call levels and (b) the number of the nuisance calls, wherein each adjusted nuisance-call level complements and varies inversely with a corresponding said adjusted reference service level, and
directing the predictive dialer to produce the adjusted reference service level compensated by the gain factor comprises
directing the predictive dialer to produce a nuisance-call level corresponding to the adjusted reference service level and compensated by the gain factor.

28. An apparatus comprising:
a predictive dialer for initiating calls; and
a feedback control for controlling operation of the predictive dialer through a first feedback loop that automatically determines a difference between a desired reference service level and a service level realized by calls that were initiated by the predictive dialer, automatically adjusts the reference service level for error represented by the determined difference, and automatically directs the predictive dialer to produce the adjusted reference service level, to converge the realized service level to the desired reference service level.

29. The apparatus of claim 28 wherein:
the first feedback loop of the feedback control operates repeatedly over a time, and the feedback control further comprises a second feedback loop that automatically directs the predictive dialer to attenuate oscillations of the realized service level or to compensate for systematic errors.

30. The apparatus of claim 29 wherein:
the feedback control via the second feedback loop generates a calibration factor that is a function of the adjusted service levels which the predictive dialer was directed to produce over a time and a number of nuisance calls among the calls initiated by the predictive dialer over the time, and automatically directs the predictive dialer to produce the adjusted reference service level modified by the calibration factor.

31. The apparatus of claim 29 wherein:
the feedback control via the second feedback loop generates a calibration factor that is a ratio of (a) a sum of complements of adjusted service levels which the predictive dialer was directed to produce over a time, modified by corresponding calibration factors and (b) a number of nuisance calls among the calls initiated by the predictive dialer over the time, and automatically directs the predictive dialer to produce the adjusted reference service level modified by the calibration factor.

32. The apparatus of claim 29 wherein:
the feedback control via the second feedback loop generates a calibration factor that is a ratio of (a) a sum of nuisance-call service levels which the predictive dialer was directed to produce over a time, modified by corresponding calibration factors, wherein each nuisance-call service level complements and varies inversely with a corresponding adjusted service level, and (b) a number of nuisance calls among the calls initiated by the predictive dialer over the time, and automatically directs the predictive dialer to produce a nuisance-call level corresponding to the adjusted reference service level and modified by the calibration factor.

33. The apparatus of claim 28 wherein:
the first feedback loop operates repeatedly over a time, and the feedback control further comprises a second feedback loop that automatically directs the predictive dialer to keep oscillations of the realized service level relative to the reference service level above the reference service level.

34. The apparatus of claim 33 wherein:

the feedback controller via the second feedback loop automatically determines over a time a margin by which calls initiated by the predictive dialer that are answered by persons (hits) and that are not nuisance calls (successes) exceed successes required over the time to achieve the reference service level, and varies, in direct relation to a size of the margin, a size of adjustment for the error that the first feedback loop makes in the reference service level.

35. The apparatus of claim 28 wherein:

the feedback control further controls the operation of the predictive dialer through a second feedback loop that automatically determines a second difference between a number of calls initiated by the dialer that are answered by persons (hits) and that are not nuisance calls (successes) and a number of successes required to achieve the reference service level, and automatically adjusts the error for the second difference, and the feedback control adjusts the reference service level for the adjusted error.

36. The apparatus of claim 28 wherein:

the first feedback loop of the feedback control operates repeatedly over a time, and the feedback control further comprises a second feedback loop that automatically directs the predictive dialer to compensate for realized nuisance-call rates relative to dialing aggressiveness settings of the predictive dialer.

37. The apparatus of claim 36 wherein:

the feedback control via the second feedback loop generates a gain factor that is a function of the adjusted reference service levels which the predictive dialer was directed to produce over a time and a number of nuisance calls among the calls initiated by the predictive dialer over the time, and automatically directs the predictive dialer to produce the adjusted reference service level compensated by the gain factor.

38. The apparatus of claim 37 wherein:

the gain factor is a ratio of (a) a sum of complements of the adjusted reference service levels compensated by corresponding said gain factors and (b) the number of the nuisance calls.

39. The apparatus of claim 37 wherein:

the gain factor is a ratio of (a) a sum of adjusted nuisance-call levels and (b) the number of the nuisance calls, wherein each adjusted nuisance-call level complements and varies inversely with a corresponding said adjusted reference service level, and the feedback control automatically directs the predictive dialer to produce a nuisance-call level corresponding to the adjusted reference service level and compensated by the gain factor.

40. An apparatus comprising:

a predictive dialer for initiating calls; and a feedback control for controlling operation of the predictive dialer that repeatedly causes the predictive dialer to adjust its initiating of calls for a difference between a desired reference service level and a service level realized by calls that were initiated by the predictive dialer, repeatedly causes the predictive dialer to adjust the initiating of calls so as to compensate for realized nuisance-call rates relative to dialing aggressiveness settings of the predictive dialer, and repeatedly causes the predictive dialer to adjust the initiating of calls so that oscillations of the realized service level remain above the reference service level.

41. An apparatus comprising:

a predictive dialer for initiating calls; and a feedback control for controlling operation of the predictive dialer, comprising a first feedback loop for repeatedly causing the predictive dialer to adjust the initiating of calls for a difference between a desired reference service level and a service level realized by calls that were initiated by the predictive dialer so as to converge the realized service level to the desired reference service level;

a second feedback loop for repeatedly causing the predictive dialer to adjust the initiating of calls so as to attenuate oscillations of the realized service level or to compensate for systematic errors; and a third feedback loop for repeatedly causing the predictive dialer to adjust the initiating of calls so that oscillations of the realized service level remain above the reference service level.

42. An apparatus comprising:

a predictive dialer for initiating calls; and a feedback control for controlling operation of the predictive dialer, that determines a realized service level corresponding to a ratio of a number of calls initiated over a time by the predictive dialer that are answered by a person (hits) and a number of the hits that are not nuisance calls (successes), determines a scaled first difference between a desired reference service level and the realized service level, determines a scaled second difference between the number of successes and a number of successes required to achieve the reference service level, adjusts the reference service level for the scaled first difference and the scaled second difference to yield a presently-desired service level, determines a calibration factor corresponding to a ratio of (a) a sum over a time of presently-desired nuisance-call levels modified by the calibration factor, wherein the presently-desired nuisance-call levels over the time correspond to and complement the presently-desired service levels over the time, and (b) a sum over the time of the nuisance calls, modifies the presently-desired nuisance-call level corresponding to the presently-desired service level by the calibration factor to obtain a calibrated said presently-desired nuisance-call level, and directs the predictive dialer to produce a calibrated presently-desired service level corresponding to the calibrated presently-desired nuisance-call level.

43. A computer-readable medium containing executable instructions which, when executed in a computer, cause the computer to perform the method of:

repeatedly causing a predictive dialer to adjust its initiating of calls for a difference between a desired reference service level and a service level realized by calls that were initiated by the predictive dialer;

repeatedly causing the predictive dialer to adjust the initiating of calls so as to compensate for realized nuisance-call rates relative to dialing aggressiveness settings of the predictive dialer; and repeatedly causing the predictive dialer to adjust the initiating of calls so that oscillations of the realized service level remain above the reference service level.

44. A computer-readable medium containing executable instructions which, when executed in a computer, cause the computer to perform the method of:

repeatedly causing a predictive dialer to adjust its initiating of calls for a difference between a desired reference service level and a service level realized by calls that were initiated by the predictive dialer, to converge the realized service level to the desired reference service level;

repeatedly causing the predictive dialer to adjust the initiating of calls so as to attenuate oscillations of the realized service level or to compensate for systematic errors; and repeatedly causing the predictive dialer to adjust the initiating of calls so that oscillations of the realized service level remain above the reference service level.

45. A computer-readable medium containing executable instructions which, when executed in a computer, cause the computer to perform the method of:

determining a realized service level corresponding to a ratio of a number of calls initiated over a time by the predictive dialer that are answered by a person (hits) and a number of the hits that are not nuisance calls (successes);

determining a scaled first difference between a desired reference service level and the realized service level;

o determining a scaled second difference between the number of successes and a number of successes required to achieve the reference service level;

adjusting the reference service level for the scaled first difference and the scaled second difference to yield a presently-desired service level;

determining a calibration factor corresponding to a ratio of (a) a sum over a time of presently-desired nuisance-call levels modified by the calibration factor, wherein the presently-desired nuisance-call levels over the time correspond to and complement the presently-desired service levels over that time, and (b) a sum over the time of the nuisance calls;

modifying the presently-desired nuisance-call level corresponding to the presently-desired service level by the calibration factor to obtain a calibrated said presently-desired nuisance-call level; and directing the predictive dialer to produce a calibrated presently-desired service level corresponding to the calibrated presently-desired nuisance-call level.

* * * * *